Patented Mar. 30, 1943

2,314,988

UNITED STATES PATENT OFFICE 2,314,988

TREATMENT OF FAT CONTAINING MATERIALS, AND PRODUCT

William Redmond Johnston, Bronx, and Herbert C. Gore and Charles N. Frey, Scarsdale, N. Y., assignors to Standard Brands Incorporated, New York, N. Y., a corporation of Delaware No Drawing. Application January 30, 1940, Serial No. 316,316

9 Claims. (Cl. 99—163)

The invention relates to a method for retarding or inhibiting deleterious change in fatty oils and fat-containing materials, and to an oleaginous product resulting therefrom.

More particularly, it pertains to a fatty body in which rancidity is inhibited or retarded, and includes correlated improvements and discoveries whereby keeping qualities of fatty materials are enhanced.

An object of the invention is to provide a method in accordance with which fatty oils and fat-containing materials may be maintained in a fresh, non-rancid condition for relatively extended periods.

Another object of the invention is the provision of a method for preventing or retarding changes in fatty oils and fats which lead to the development of undesired tastes and odors, and which may be readily, efficiently, and economically carried out on a commercial scale.

A further object of the invention is the provision of a product containing a fatty oil or a fat in which the reactions that produce compounds occasioning rancidity are materially retarded or definitely inhibited.

Other and more specific objects of the invention are to provide a stable shortening material by incorporating therewith coffee oil, and a lard having little tendency to become rancid due to the incorporation of green coffee oil therewith.

Other objects of the invention will in part be obvious and will in part appear hereinafter.

The invention accordingly comprises the several steps, and the relation of one or more of such steps with respect to each of the others, and the product possessing the features, properties, and the relation of constituents, which are exemplified in the following detailed disclosure, and the scope of the invention will be indicated in the claims.

In the practice of the invention, a fatty material, e. g., a fatty oil, a fat, and the like, may be rendered substantially stable with respect to becoming rancid, i. e., undergoing one or more changes, probably oxidative, whereby compounds of undesired taste and odor are formed, by incorporating therewith coffee oil in an amount sufficient markedly to retard or definitely to inhibit the development of rancidity. The coffee oil preferably is that obtainable from green coffee, although coffee oil from a roasted coffee might be used. Such an oil, however, has been found to be not as effective as that from green coffee. It may be further observed that utilization may also be made of the unsaponifiable portion or portions which may be separated from coffee oil. Moreover, the retardation of rancidity is practically directly proportional to the amount of the coffee oil included in the fatty material, and we have obtained satisfactory results when using 0.2 per cent. and upwards to 25 per cent. by weight of the fatty material, such as lard. Fatty materials which may be thus enhanced include lard, butter, margarines, tallows, fats, and in fact, all materials containing the higher members of the fatty acid series, i. e., acids having the probable general formulas $C_nH_{2n}O_2$ and $C_nH_{2n-2}O_2$ and their derivatives, especially the glycerides. By way of illustrative exemplification of the process, samples of lard were treated by having incorporated therewith green coffee oil. Portions of the lard so treated were permitted to stand for about two weeks at a temperature of 30° C., whereas other portions were used in the preparation of piecrust. The piecrusts prepared and containing the treated lard were stored for a period of about two weeks at a temperature of 30° C. At the end of the test period, both the piecrust and the lard portions were fresh and free from rancidity. The quantities of green coffee oil varied from 2 to 20 per cent, based on the weight of lard.

The unsaponifiable portion of green coffee oil was extracted and dissolved in lard in amounts varying from 0.05 per cent to 1.0 per cent by weight of the lard. Portions of the lard so treated were stored at 30° C., and other portions were included in piecrust also stored at 30° C. After a period of about three weeks, the samples containing 0.05 to 0.1 per cent of the unsaponifiable portion were very slightly rancid, whereas the other portions containing 0.2, 0.5 and 1.0 per cent showed no rancidity. Piecrusts made with other portions of the treated lard were stored at room temperature with similar results. Furthermore, a piecrust made with lard containing 1.0 per cent of unsaponifiable portions of green coffee oil remained free from development of rancid odor for a period of eight weeks at a temperature of 30° C. in the dark. A similar sample stored in the light also showed stability against rancidity. On the other hand, control samples of lard stored in the light and in the dark at a temperature of 30° C. were definitely rancid after a period of three weeks. The results of these tests evidence, as indicated above, that the retardation or inhibition of rancidity is practically proportional to the quantity of coffee oil or unsaponifiable portion, incorporated with the fatty material. Expressed somewhat differently, the smaller the content of coffee oil or unsaponifiable matter obtainable therefrom, the greater the development of rancidity, and, conversely, the larger the content of coffee oil, the greater is the retardation of rancidity.

By the foregoing procedure, i. e., incorporating coffee oil with a fatty material, there may be obtained, with facility and on any desired scale and to a desired extent, a retardation of rancidity. Accordingly, there is provided a procedure whereby fatty materials and products that include fatty oils or fats, are stabilized, and hence rendered capable of being stored, either in the light or in the dark, at room temperatures, for extended periods. The coffee oil or unsaponifiable portion therefrom may be incorporated in a suitable manner and through the utilization of apparatus which is inexpensive, may be readily obtained, and is of low operating cost.

In addition to the fatty oils and fats above mentioned, it will be realized that the process is adapted for the treatment of various fats used in food and bakery products, also for the treatment of oil-bearing nuts and fruits, such as walnuts, peanuts, cashew-nuts, oranges, lemons, limes and the like, and oils and butters produced therefrom. In all cases, the fatty material is rendered relatively stable, and development of undesirable tastes and odors is retarded. The expression "fatty substance" in the claims will be understood to include the foregoing.

This application is a continuation-in-part of our copending application Serial No. 167,018, filed October 2, 1937.

Since certain changes in carrying out the above method and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for inhibiting deleterious changes in fatty materials which comprises incorporating the unsaponifiable portion of coffee oil with a fatty substance.

2. A method for inhibiting deleterious changes in fatty materials which comprises incorporating the unsaponifiable portion of green coffee oil with a fatty substance.

3. A method for inhibiting deleterious changes in fatty materials which comprises incorporating the unsaponifiable portion of coffee oil with a fatty oil.

4. A method for inhibiting deleterious changes in fatty materials which comprises incorporating the unsaponifiable portion of coffee oil with a fat.

5. A method for inhibiting deleterious changes in fatty materials which comprises incorporating the unsaponifiable portion of coffee oil with lard.

6. As a composition of matter, a fatty substance having a tendency to become rancid, and having the unsaponifiable portion of coffee oil incorporated therein to inhibit deleterious change.

7. As a composition of matter, a fatty substance having a tendency to become rancid, and having the unsaponifiable portion of green coffee oil incorporated therein to inhibit deleterious change.

8. As a composition of matter, a fatty oil having a tendency to become rancid, and having the unsaponifiable portion of coffee oil incorporated therein to inhibit deleterious change.

9. As a composition of matter, lard having the unsaponifiable portion of coffee oil incorporated therein to inhibit deleterious change.

WILLIAM REDMOND JOHNSTON
HERBERT C. GORE.
CHARLES N. FREY.